May 31, 1960 D. A. STROM 2,938,671
RIGHT TRIANGLE SOLVER
Filed May 9, 1956 2 Sheets-Sheet 1

INVENTOR.
Donald A. Strom
BY
ATTORNEY.

May 31, 1960

D. A. STROM 2,938,671

RIGHT TRIANGLE SOLVER

Filed May 9, 1956

INVENTOR.
Donald A. Strom
BY
ATTORNEY.

UNITED STATES PATENT OFFICE 2,938,671
Patented May 31, 1960

2,938,671

RIGHT TRIANGLE SOLVER

Donald A. Strom, Santa Monica, Calif., assignor, by mesne assignments, to the United States of America as represented by the Secretary of the Air Force Filed May 9, 1956, Ser. No. 583,823

1 Claim. (Cl. 235—191)

This invention relates to computers, and more particularly to a computer for solving the equation of a right triangle.

It is among the objects of this invention to provide
A new and improved right triangle solver computer;
A new and improved computer for solving right triangles in which the sides may be continuously changing.

In accordance with this invention, a right triangle solver includes three computing devices respectively associated with the three triangle sides. Each of these devices includes separate means for deriving signals proportional to the product of the associated side and the rate of change thereof. Adding means derives the algebraic sum of the product signals for the three sides, and applies the sum signal to one of the computing devices.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
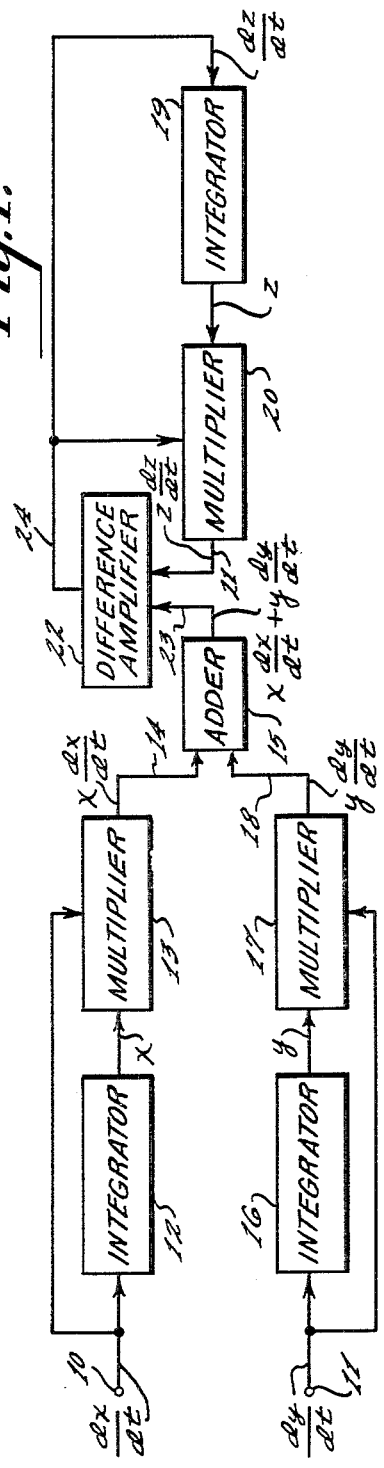
Figure 1 is a schematic block diagram of a triangle solver system embodying this invention.

In the system of Figure 1, input signals are received at separate input terminals 10 and 11. The input terminal 10 receives a signal $$\frac{dx}{dt}$$

which is the rate of change of a first variable $x$. This terminal 10 is connected to the input of an integrator 12 and also to one input of a multiplier 13. The output of the integrator 12 is connected to the other input of the multiplier 13. The output 14 of the multiplier 13 is connected to one input of an adder 15. The input terminal 11 receives a signal $$\frac{dy}{dt}$$

which is the rate of change of a second variable $y$. This terminal 11 is connected to an integrator 16 and also to one input of a multiplier 17. The other multiplier input is the integrator output, and the output 18 of the multiplier 17 is connected to a second input of the adder 15. A third integrator 19 and multiplier 20 are connected in a similar manner. The output 21 of the multiplier 20 is connected to one input of a difference amplifier 22. Connected to the other input of the difference amplifier 22 is the output 23 of the adder 15. The output of the difference amplifier 22 is connected by way of a feedback connection 24 to the input of the integrator 19 and to an input of the multiplier 20.

The integrator 12 integrates the input signal $$\frac{dx}{dt}$$

and produces an output signal proportional to the first variable $x$. The multiplier 13 produces at the output 14 a product signal $$x\frac{dx}{dt}$$

which is the product of the first variable and its rate of change. In a similar manner, the integrator 16 and multiplier 17 operate to produce at the output connection 18 a second product signal $$y\frac{dy}{dt}$$

which is the product of the second variable and its rate of change. These product signals are added in the adder 15, and the sum signal is applied to one of the inputs of the difference amplifier 22. Assuming that the common input to the integrator 19 and the multiplier 20 is $$\frac{dz}{dt}$$

this integrator 19 and multiplier 20 operate to produce a product signal $$z\frac{dz}{dt}$$

at the connection 21, which product is applied to the other input of the difference amplifier 22. The difference amplifier 22 produces an output signal proportional to the difference between its two inputs, which difference signal is fed back by way of the connection 24 as the signal $$\frac{dz}{dt}$$

Thus, $$k\left(x\frac{dx}{dt}+y\frac{dy}{dt}-z\frac{dz}{dt}\right)=\frac{dz}{dt}$$

where $k$ is the gain of the amplifier 22. By dividing by $k$ and collecting terms, this equation may be rewritten as follows:

$$x\frac{dx}{dt}+y\frac{dy}{dt}=\frac{dz}{dt}\left(\frac{1}{k}+z\right)$$

As $k$, the amplifier gain, becomes large the term in the parenthesis on the right side of this last equation approaches $z$. Under such circumstances, the equation $$x\frac{dx}{dt}+y\frac{dy}{dt}=z\frac{dz}{dt}$$

is approximately true. This last equation is the differential form of the equation for a right triangle; that is, of $x^2+y^2=z^2$. Thus, $z$ in the differential equation is the hypotenuse of a right triangle whose legs are $x$ and $y$, and $$\frac{dz}{dt}$$

is the rate of change of this hypotenuse. The system of Figure 1 operates with two inputs that are proportional to the rates of change of the legs of the triangle. These inputs are integrated to produce signals proportional to these legs of the triangle. The feedback loop that includes the elements 19, 20, 21, 22, and 24 operates to solve the differential form of the equation of the triangle and produce signals proportional to the hypotenuse of the triangle and its rate of change.

Figure 2:
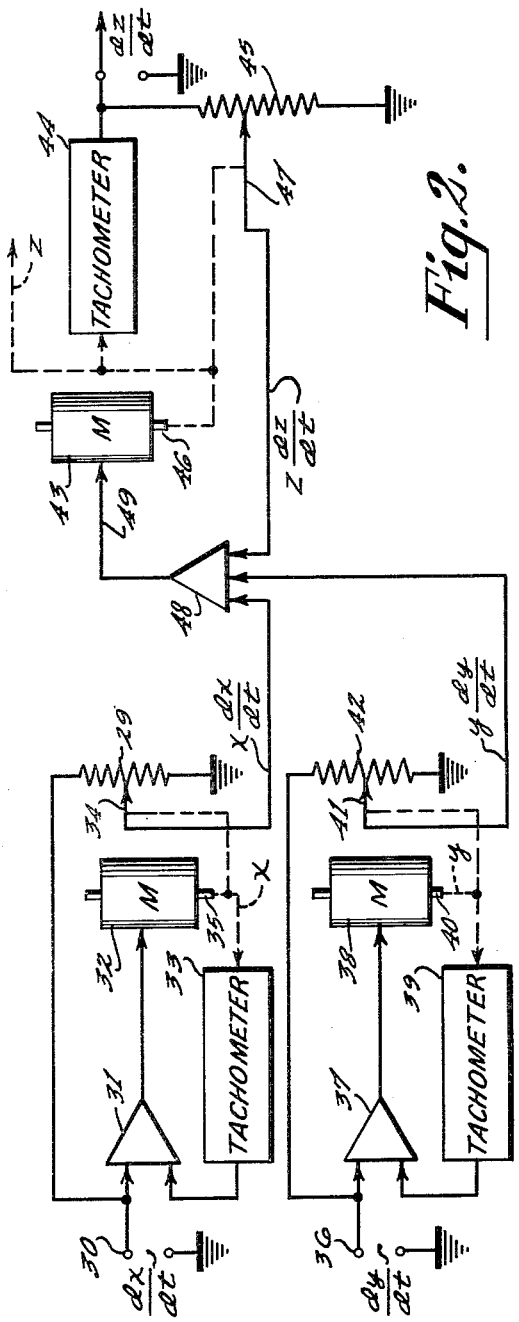
Figure 2 is a schematic circuit and block diagram of one form of the system shown in Figure 1.

In Figure 2, a particular form of the invention is shown in which electromechanical components are employed. Input voltages proportional to $$\frac{dx}{dt}$$

are applied to the input terminal 30. The input terminal 30 is connected to one input of a summing amplifier 31 and also to one terminal of the potentiometer 29, the other terminal of which is connected to a reference potential shown as the conventional ground symbol. The output of the amplifier 31 is used to energize a servomotor 32. The output shaft 35 of the servomotor 32 positions an adjustable tap 34 on the potentiometer 29 and drives a tachometer or induction generator 33. The output of the tachometer 33 is supplied as a second input to the amplifier 31.

The servomotor 32 operates to produce an angular displacement of its shaft 35 that is the integral with respect to time of the voltage which energizes it. The tachometer 33 operates to differentiate this shaft displacement (produces a voltage proportional to the speed of rotation of the shaft), and applies the differentiated signal to the amplifier 31 in opposite phase relationship to the input signal $$\frac{dx}{dt}$$

Consequently, the angular position of the shaft 35 is proportional to the variable $x$, and the position of the tap 34 of the potentiometer 29 is proportional to this shaft position $x$. Thus, the portion of the voltage across the potentiometer 29 which exists at the tap 34 is proportional to the shaft position $x$, and the voltage at the tap 34 is proportional to $$x\frac{dx}{dt}$$

In a similar manner, a $y$-signal integrator is provided by an amplifier 37, a servomotor 38 and a tachometer 39 connected in a manner similar to that described for the $x$-signal integrator. The output shaft 40 of the servomotor 38 positions a tap 41 on a potentiometer 42 that receives the input signal $$\frac{dy}{dt}$$

from the input terminal 36. A $z$-signal servomotor 43 drives a tachometer 44, the output of which is applied across a potentiometer 45. The servomotor shaft 46 positions the tap 47 of the potentiometer 45 at a position corresponding to the voltage level $$z\frac{dz}{d}$$

The taps 34, 41, and 47 of the three potentiometers 29, 42, and 45 are connected to the inputs of a summing amplifier 48. The output of the summing amplifier 48 is fed back by way of the connection 49 to energize the servomotor 43.

The signals at the taps 34 and 41 are respectively the $x$ and $y$ product terms of the differential equation of a right triangle. The signal at the tap 47 is proportional to the $z$ product term of this equation. These product signals are summed algebraically in the amplifier 48 with the phase relationships set in accordance with the differential equation (that is, the $z$ product signals are subtracted from the sum of the $x$ and $y$ product signals). Thus, the output of the amplifier 48 is proportional to the rate of change $$\frac{dz}{dt}$$

in accordance with the operation described above. This rate of change is integrated by the servomotor 43 to produce a shaft-position output proportional to the variable $z$. The shaft position is differentiated by the tachometer 34 to produce a voltage output proportional to the rate of change $$\frac{dz}{dt}$$

Various components suitable for use in the system of Figure 2 are well-known in the art. The following components are considered appropriate: the servomotors and tachometers may be Kearfott Motor-Generators R800. Each potentiometer may be a 50,000 ohm Helipot E40. The summing amplifier 48 may be the type described in the book by Seely "Electron-Tube Circuits," McGraw-Hill, 1950, at page 148. An additional amplification stage following the summing amplifier 48 may be necessary to supply power for operating the motor 43. The amplifiers 31 and 37 may be two input summing amplifiers or difference amplifiers such as are described in Seely, cited above, at page 146 together with additional amplification stages where needed. Gear trains (not shown) may be used where necessary to provide appropriate scale factors.

The system of Figure 1 may be used with electronic multiplier and integrator components. For example, the integrators may be of the type described in Seely, cited above, at page 148; and the multipliers may be any of those described in Seely, at page 152. Summing and difference amplifiers may be of the type noted above.

In the systems of Figures 1 and 2, the inputs are the rates of change of the legs $x$ and $y$ of the right triangle, and the output is the hypotenuse $z$. These systems may be modified to receive input signals that are a function of one of the legs and the hypotenuse and to derive signals that are a function of the other leg of the triangle. In this modification, shown in Figure 3, the $x$ product signals are derived in the same manner as discussed above with respect to Figure 1. The $z$ product signals are derived, for example, from the rate of change signals $$\frac{dz}{dt}$$

in the manner described above with respect to Figure 1 for the $y$ product signals. A difference amplifier 50 subtracts the $z$ product signal from the $x$ product signal, and applies the difference to one input of the difference amplifier 22. Parts corresponding to those previously described are referenced by the same numerals.

Figure 3:
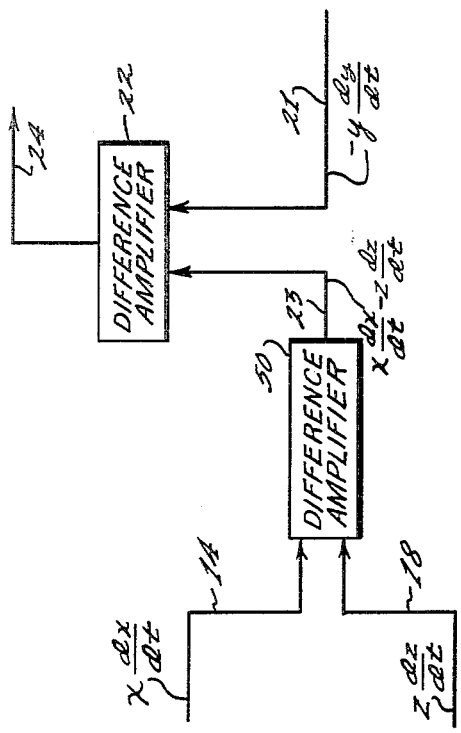
Figure 3 is a schematic block diagram of a portion of a modification of the system shown in Figure 1.

The $y$ product signal is derived in the feedback loop in the manner described above with respect to the system of Figure 1 for the $z$ product signal. The $y$ product signal is applied to the other input of the difference amplifier 22 by way of the connection 21. This $y$ product signal is reversed in phase, as shown in Figure 3, in order that the arithmetical operation performed by the difference amplifier 22 results in the differential function of the equation for the right triangle. The feedback loop by way of the connection 24 operates in the manner described above to make this differential function substantially equal to zero. In this way, the system of Figure 3 solves the differential equation for a leg of the triangle from input signals that are functions of the other leg and of the hypotenuse.

Figure 4:
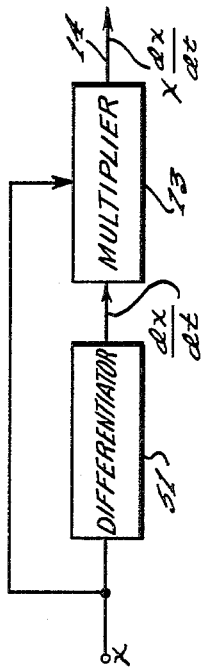
Figure 4 is a schematic block diagram of a portion of another modification of the system shown in Figure 1.

In a portion of the right triangle solver system shown in Figure 4, the $x$ input is a signal proportional to the variable $x$ (instead of the rate-of-change signal shown in Fig. 1). This $x$ signal is differentiated in a differentiator 51. The differentiated $x$ signal is multiplied by the $x$ signal in the multiplier 13 (parts corresponding to those previously described are referenced by the same numerals) to produce the $x$ product signal. This arrangement of Figure 4 may be used with the remainder of the system of Figure 1 (that is, with the $y$ and $z$ signal portions thereof) to solve for the hypotenuse of the triangle; or it may be used with a system such as is discussed above with respect to Figure 3 to solve for the other leg of the triangle. This arrangement shown in Figure 4 for using as inputs signals proportional to the sides of a triangle (the $x$ or $y$ or $z$ signals) may be used in a system in which both of the inputs are such signals; under such circumstances, differentiators may be used in place of the integrators 12, 16, and 19. Each of the $x$, $y$, and $z$ computing units tends to operate independently of the others. Therefore, an integrator or a differentiator may be generally used in any one of these units without regard to what is used in the others.

Where this arrangement of Figure 4 is used with electromechanical components such as are shown in Figure 2, the $x$ input is in the form of a shaft rotation which positions a potentiometer tap, and also drives a tachometer to derive the rate-of-change signal; this derived signal is applied across the potentiometer in the manner described above in Figure 2 to produce the $x$ product signal at the potentiometer tap.

The principles of this invention are not restricted in their application to the solution of the equation of a plane right triangle. This invention may also be used to solve the differential form of the equation of a "triangle" in $n$ dimensional space. Such a "triangle" may consist of a vector having $n$ components, the relationship of these elements being such that the square of the vector would equal the sum of the squares of the components. The differential form of this relationship may be solved in a manner similar to that described above. A separate computing unit is provided for each one of the elements of this relationship, $n$ of the units being input units in the manner of the $x$ and $y$ units of Figure 1, and one of the units being an output unit in the manner of the $z$ unit of Figure 1. The signals produced by these units may be summed and the sum fed back to the output unit to solve the relationship in a manner similar to that described above.

Thus, a new and improved computer is provided for solving triangles in which the sides may be continuously changing. This computer may be embodied in various forms and may receive as inputs signals proportional to two sides of the triangle or proportional to the rates of change. The computer solves the differential equation of the triangle to provide the third side of the triangle and its rate of change.

What is claimed is:

A computer for solving an equation of a right triangle comprising first, second and third computing devices, each respectively associated with the sides of a right triangle, each of said computing devices including means for generating signals proportional to the product of the associated one of said sides and the rate of change thereof, each of said signal generating means including means for deriving a signal proportional to one of the factors of said associated product signal when signals proportional to the other of said product factor are received; first input means for supplying signals proportional to said one factor of the associated product signal to said first computing device, second input means for supplying signals proportional to said one factor of the associated product signal to said second computing device, means for receiving and algebraically combining the product signals of said first and second computing means, a difference amplifier for algebraically subtracting the product signal of said third computing device from the output signal of said combining means and third input means for applying the output signal of said difference amplifier as the input to said third computing device, whereby the difference signal obtained at the output of said difference amplifier is applied to the third computing device as a feedback signal.

References Cited in the file of this patent
UNITED STATES PATENTS
2,634,909    Lehmann _____ Apr. 14, 1953

OTHER REFERENCES

Electrical Analogue Computing (Mynall), Electronic Engineering, July 1947, pages 214–217.

Electronic Instruments (Greenwood, Holdam and Macrae), Radiation Laboratory Series No. 21, published by McGraw-Hill Book Co., 1948, page 132.